US006592308B1

(12) United States Patent
Owen

(10) Patent No.: US 6,592,308 B1
(45) Date of Patent: Jul. 15, 2003

(54) MACHINE TOOL GUIDE

(76) Inventor: Leslie John Owen, 30 Bennett Road, Thurgoona, New South Wales (AU)

( * ) Notice: Subject to any disclaimer, the term of this patent is extended or adjusted under 35 U.S.C. 154(b) by 0 days.

(21) Appl. No.: 09/821,457

(22) PCT Filed: Oct. 4, 1999

(86) PCT No.: PCT/AU99/00851

§ 371 (c)(1), (2), (4) Date: May 22, 2001

(87) PCT Pub. No.: WO00/20179

PCT Pub. Date: Apr. 13, 2000

(30) Foreign Application Priority Data

Oct. 6, 1998 (AU) .................................................. 6350

(51) Int. Cl.[7] ................................................. B23C 1/20

(52) U.S. Cl. .................. 409/235; 83/486.1; 144/135.4; 408/236; 409/132

(58) Field of Search ................................ 409/132, 131, 409/175, 181, 182, 235, 236; 408/236, 237, 88; 144/135.2, 135.3, 135.4; 248/652, 653, 654, 659; 83/486.1, 614, 455, 581

(56) References Cited

U.S. PATENT DOCUMENTS 2,471,208 A * 5/1949 Gay .......................... 408/137
3,023,792 A * 3/1962 Palmer et al. ................ 188/69
3,099,298 A * 7/1963 Bellini .................... 144/134.1
3,450,176 A * 6/1969 Pollak et al. ............. 83/486.1
4,312,391 A * 1/1982 Snow ........................ 144/35.2
4,410,022 A * 10/1983 Peterson .................. 144/154.5
4,865,093 A * 9/1989 Ford et al. ............... 144/135.4

* cited by examiner

*Primary Examiner*—Daniel W. Howell
(74) *Attorney, Agent, or Firm*—Dennison, Schultz & Dougherty

(57) ABSTRACT

A guide for a machine tool including a vertical upper column (1) adapted for stable positioning at a work station and an elongate horizontally orientated arm (2) extending outwardly from and pivotally attached to the upper column at a pivot is disclosed wherein the pivot is provided by two vertically spaced apart pivot points (3) so as to allow the arm free radial movement in a horizontal plane.

13 Claims, 5 Drawing Sheets

MACHINE TOOL GUIDE

FIELD OF THE INVENTION

This invention relates to accessories for power tools and in particular relates to an improved tool guide in the form of an overhead radial arm system or device adapted to co-operate with a portable machine tool so as to guide said tool over a workpiece.

BACKGROUND OF INVENTIONS

The radial arm concept of machine tooling is a traditional technique where a track bearing rotatable arm is suspended above a workpiece. The arm is adapted for radial rotation through a horizontal plane and is provided with a machine tool which moves back and forth along the arms track. This type of tooling finds its most common application in the radial arm saw but the radial arm concept can be readily adapted to other machine tools, for example, a router.

Radial arm tools provide a highly versatile form of machining capable of cross cutting, ripping, shaping, compound miter cutting etc.

Many forms of radial arm machinery are available including a wide range of dedicated machines with permanently fitted machine tools; for example, saw heads. In addition, a range of radial arm "devices" are known which provide the skeleton of the machine fitted with a carriage that can mount a range of retro fittable machine tools including hand saws and routers.

A generally accepted limitation of such radial arm machines is a lack of precision caused by the elongate radial arm which must provide radial movement about a rearward pivot above a workpiece and in particular, the extended length of the arm and the distance the machine tool must move from the pivot point introduces many limitation to the accuracy of the set up. The length of the elongate arm and the pivoting means invariably results in the radial arm failing to achieve a fully rigid position particularly when fixed for a given sweep of the machine tool which may be required to traverse the length of the arm at an accurate height above the workpiece.

A further limitation of prior art radial arm machines is the adaptation of such machines to guide the machine tool along the length of the radial arm track as the principle mode of action with the radial arm fixed and locked at one particular radial angle.

For these reasons all prior art machines lack sufficiently accurate rearward pivot systems to allow the radial arm tracks to move in a radial sweeping motion so as to allow a machine tool to radially sweep across a workpiece surface, particularly where surface dressing of large workpieces is required.

SUMMARY OF THE INVENTION

Accordingly, in one aspect the invention provides a guide for a machine tool including a vertical upper column adapted for stable positioning at a work station and an elongate horizontally orientated arm extending outwardly from and pivotally attached to said upper column wherein said pivot is provided by at two vertically spaced apart pivot points so as to allow said arm free radial or arcuate movement in a horizontal plane.

The pivot points may be positioned outward of the central axis of said upper column. The outward position may be provided by outposts fitted to said column and vertically spaced apart.

The horizontal arm may be fitted to said pivot points by way of an elongate pivot column to provide clear rotation in a horizontal plane and reduced movement in a vertical plane.

The upper column may be vertically adjustable up and down providing a vertical adjustment of said horizontal arm relative to said workstation.

The column may telescopically co-operate with a stand means to allow said horizontal arm to be adjusted vertically relative to said workstation. The upper column may be adapted for snug telescopical fit within a stand column and provided with teflon or other lubricating means to ensure smooth co-axial movement between the upper column and the stand.

The column may be of square channel cross section to prevent radial co-axial movement but allow linear co-axial movement between the upper column and the stand column.

The liner co-axial movement may be effected by an hydraulic ram fitted to said stand and which acts on said upper column.

The horizontal arm may be provided with a carriage for mounting said machine tool and a plurality of calibrated stops along the length thereof.

The carriage may include a transmission housing incorporating roller bearings and shaped guides to ensure accurate movement of said carriage during tracking along said arm. The elongate arm may be,of square channel section mounted on the diagonal so as to provide a track for said carriage with the carriage self seating on said track.

The carriage may include a locking pin adapted to selectively engage the calibrated stops along the length of said arm so as to lock said carriage.

The horizontal arm may be provided with pivot lock to lock said arm in a selected radial position.

In another aspect the invention provides a method of surface dressing a workpiece including mounting said workpiece under the elongate arm of the guide as previously described, providing said guide with a router or like machine mounted to the carriage and passing the operating machine tool over the surface of said workpiece in a series of radial sweeps to surface dress said workpiece. The workpiece in question may be wood or the like.

BRIEF DESCRIPTION OF THE DRAWINGS

The invention will now be described with reference to the following Figures.

DETAILED DESCRIPTION OF THE INVENTION

The invention will now be described in detail with reference to a particularly preferred embodiment where the machine tool guide takes the form of a floor standing unit which can be positioned over or in relation to a workstation which may be a stationary bench or a sliding table bench.

Figure 1:
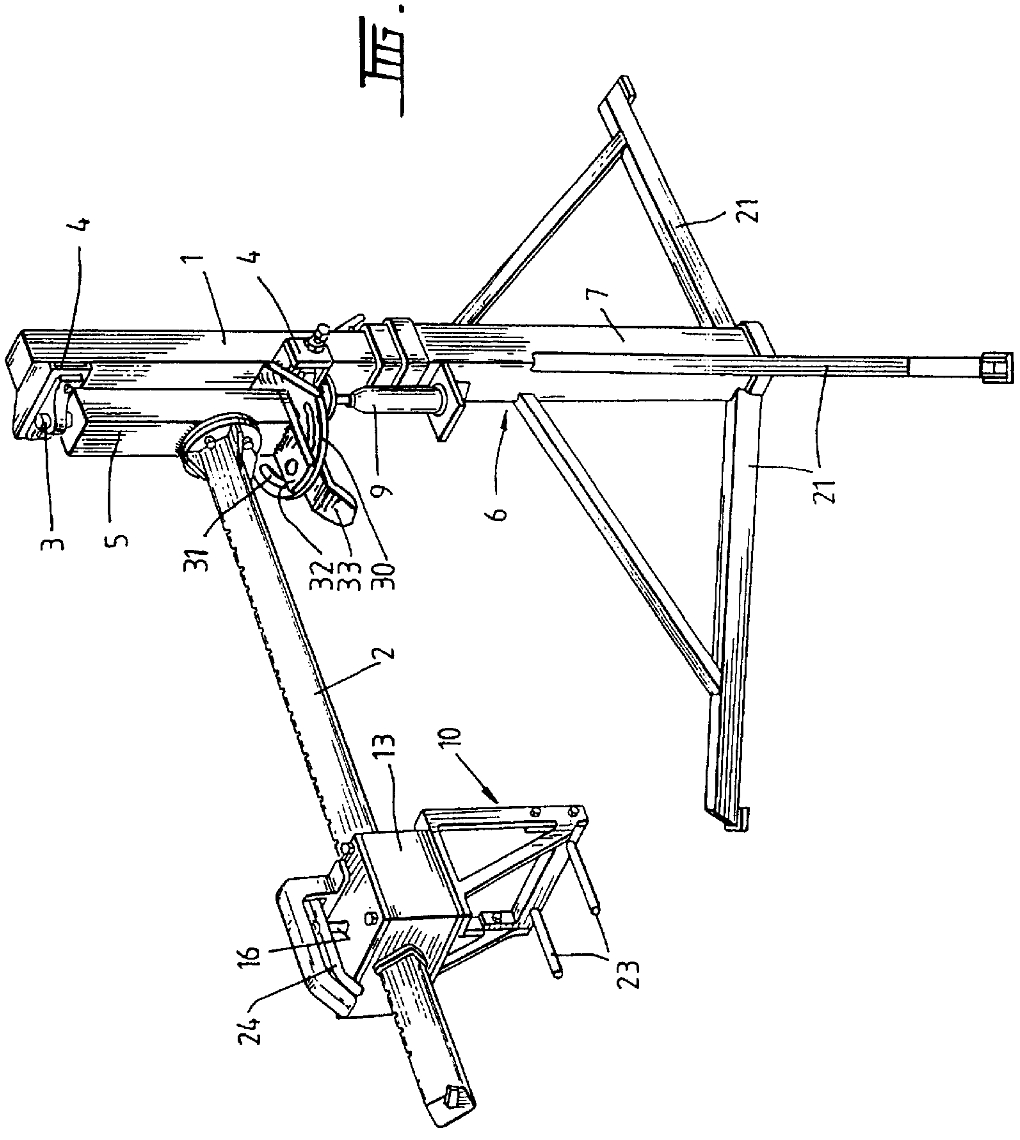
FIG. 1 shows a general front view of the guide.

Referring firstly to FIG. 1, the machine tool guide comprises a radial arm overhead device for holding a free standing machine tool and includes a vertical upper column 1 which is telescopically fitted to a stand means 6 and capable of vertical movement up and down. The stand means is adapted for permanent fitting or temporary fitting at a workstation so as to provide stable secure location of the stand and fitted vertical upper column 1. An elongate horizontally oriented arm 2 is pivotally fitted and attached to the upper column at two vertically spaced apart pivot points 3 and 3A. The lower pivot point 3A incorporates an extended lower bearing 30 incorporating an annular slot 31. The lower end of the pivot column 5 is provided with a locking foot 32 such that the radial movement of the horizontal arm 2 sweeps the locking foot 32 across the face of the lower bearing 30 and the provision of a locking lever 33 which is adapted to cooperate with the locking foot through the annular slot 31 serves as a means of locking the horizontal arm 2 in any one of a selection of radial positions. The horizontal arm provides the tracking system for the carriage 10 which is adapted for receiving a variety of machine tools, for example a router 11 (see FIG. 2).

The robust and highly accurate pivot system of the guide allows the horizontal arm 2 to freely rotate about the pivot in a radially sweeping or arcuate action so as to provide a means of passing the machine tool 11 over a broad area of a mounted workpiece.

The workpiece may be a slab of wood and would be mounted under the arm 2 so as to allow the machine tool to traverse the surface thereof with the machine tool accurately sweeping across the surface, cutting or dressing a flat face on the mounted workpiece. In order to ensure efficient and systematic operation of the guide, the carriage can be locked at a selection of positions along the length of the arm such that the mounted machine tool can be caused to sweep across the surface of the mounted workpiece in a controlled sequence of sweeping cuts to progressively form a fully dressed surface to the workpiece.

Figures 2, 5A:
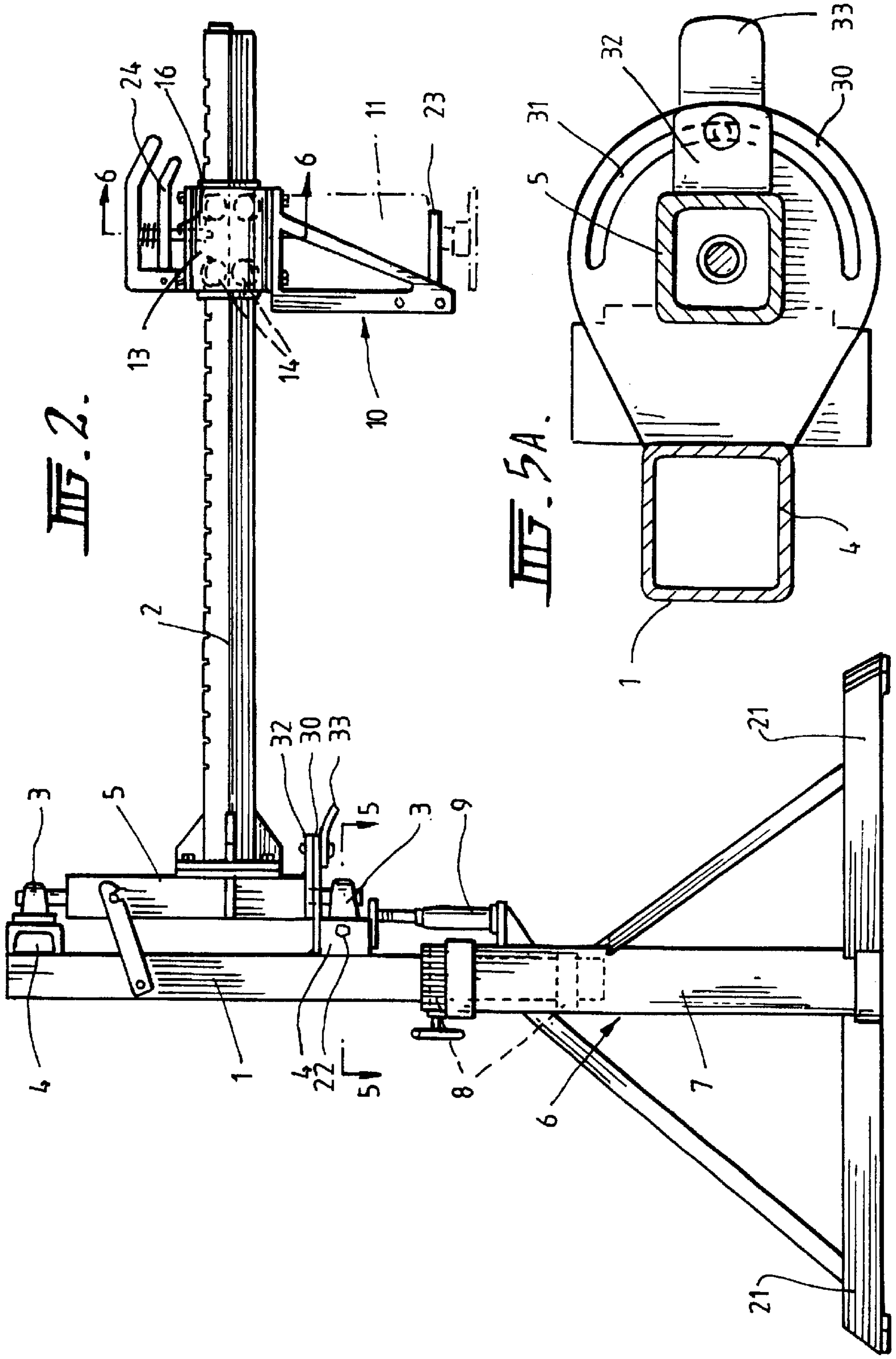
FIG. 2 shows a general rear view of the guide.
FIG. 5A shows details of the lower pivot and radial locking means.

Referring now to FIG. 2, a side ward view of the machine tool guide is shown where the upper vertical column 1 is provided with two outposts 4 which provide the pivot points 3 onto which a pivot column 5 is attached. The horizontal arm 2 is fitted to the pivot column 5 so as to pivot in a radial manner in a horizontal plane above the workstation. The vertical upper column 1 can be moved up and down with the assistance of a ram 9 fitted to the stand means and adapted to cooperate with the lower outpost 4. The outward positioning of the pivot points 3 allow the pivot column 5 substantially free movement in the radial plane without any risk of interference with the upper column 1. The dual outposts 4 which are vertically spaced apart and bridged by the pivot column 5, provide a highly rigid pivoting mechanism for the horizontal arm which, to all intents and purposes, eliminates any vertical slop or undesirable movement in the horizontal arm notwithstanding the provision of a substantially elongate horizontal arm.

Figure 3:
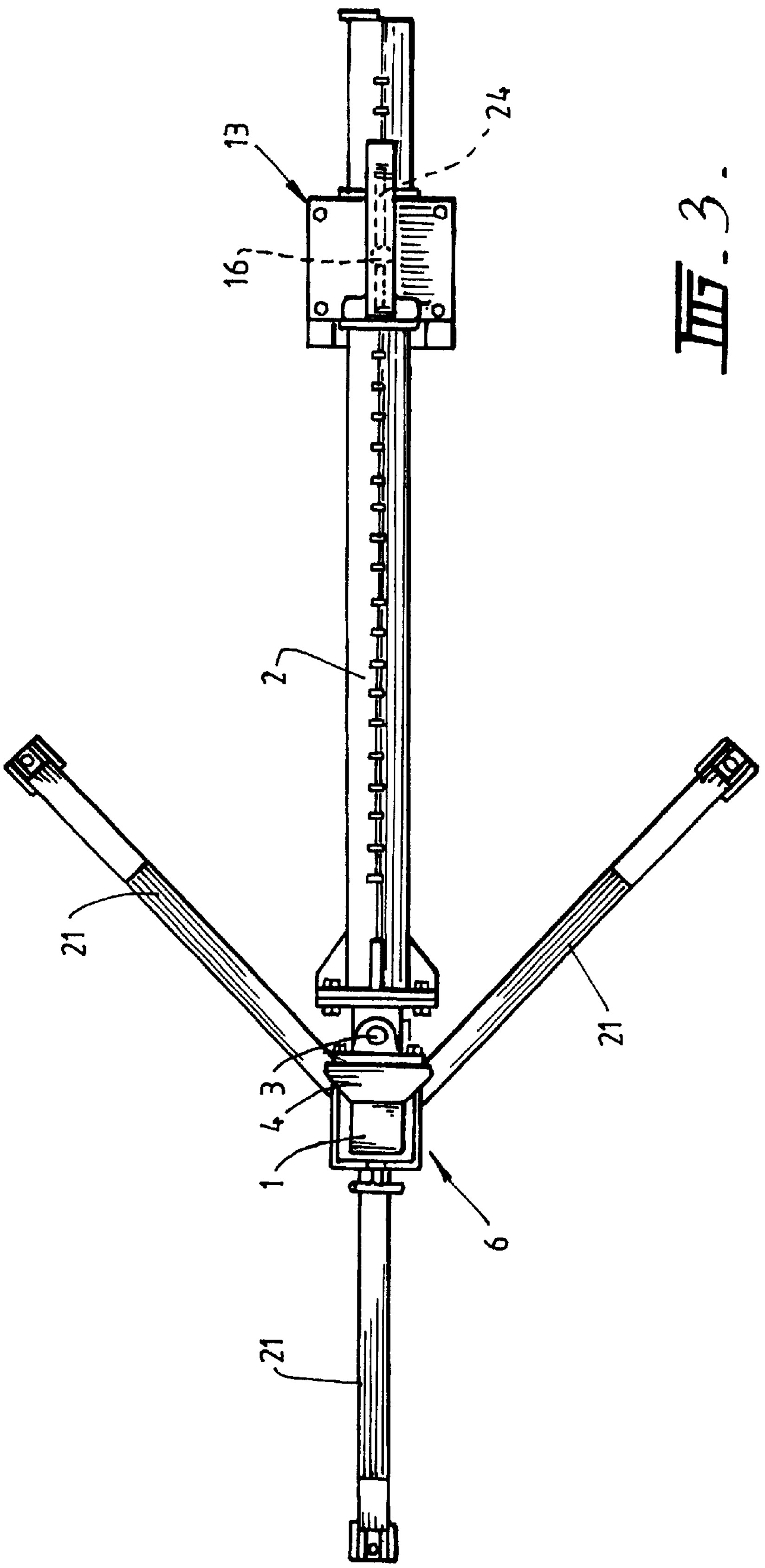
FIG. 3 shows a plan view of the guide.
Figure 4:
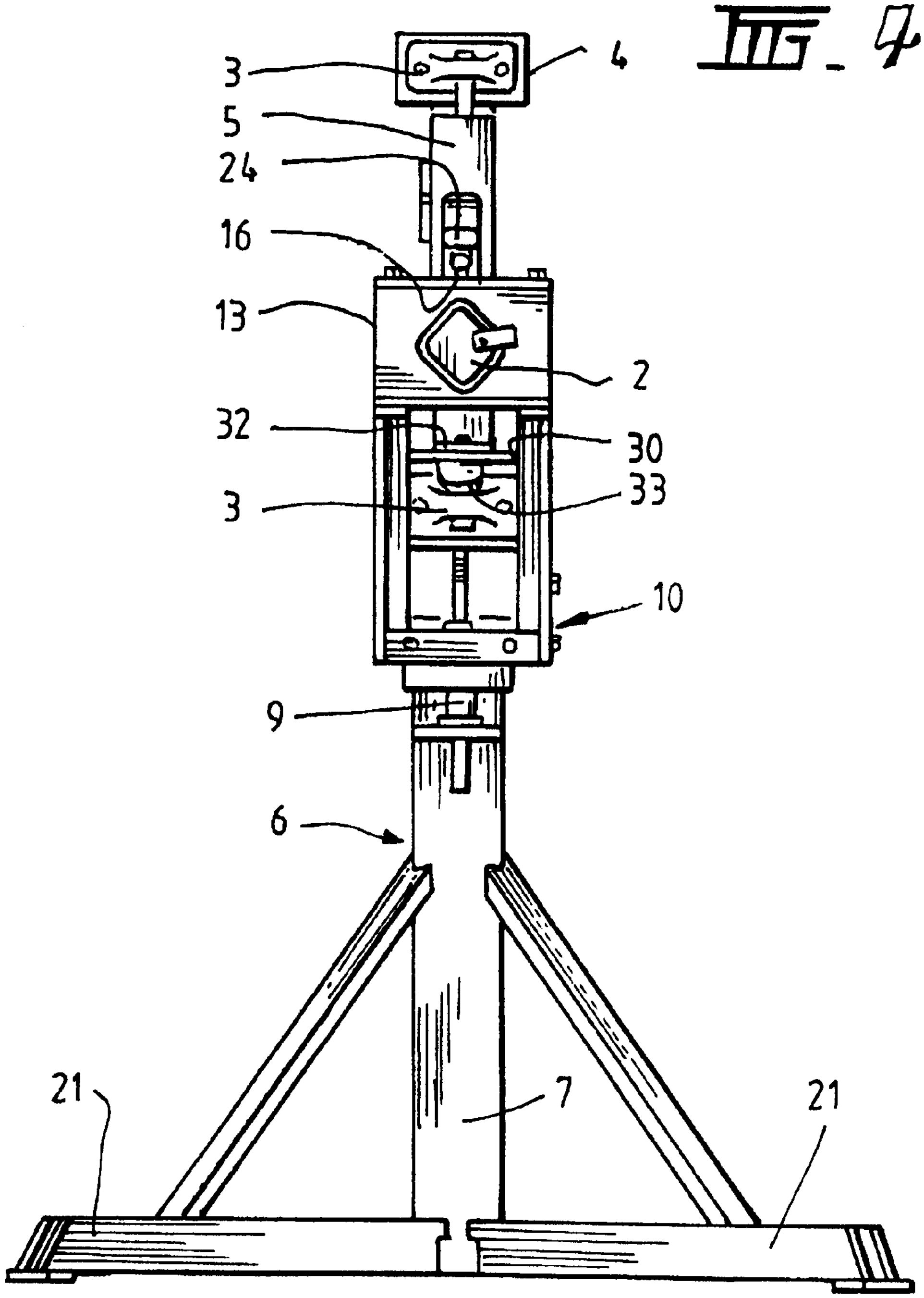
FIG. 4 shows a front view of the guide.

FIGS. 3 and 4 show a plan and front view of the guide where the stand means 6 is provided with splayed legs 21 to which are attached the square section stand column 7 in vertical orientation. To the inside of stand column 7 are provided Teflon® slides and the vertical upper column 1 is sized out of square section channel so as to smoothly cooperate, with the stand column to provide snug and smooth linear co-axial vertical motion.

Figure 5:
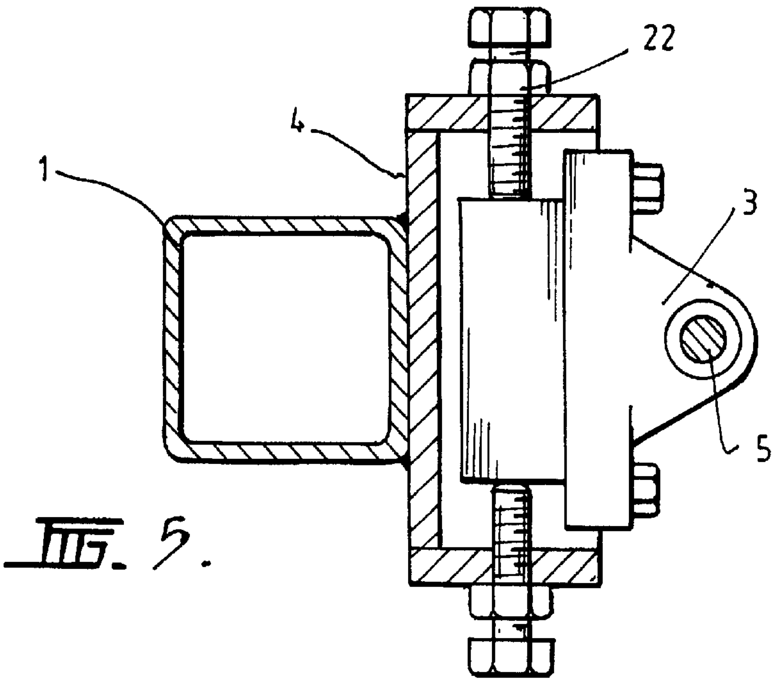
FIG. 5 shows details of the pivot mounts.

FIG. 5 shows details of the pivot block including the outpost section 4 and the pivot 3. The pivot block includes the necessary adjustment means 22 which are used to ensure and maintain accurate alignment of the horizontal arm once the whole guide is assembled and fitted.

FIG. 5A shows the lower bearing with the locking means to arrest the radial movement of the horizontal arm. The locking means comprises an oversized lower bearing 30 having an annular slot 31 on which the pivot column rests. The pivot column is provided at its lower end with a locking foot 32 extending outwardly so as to engage the annular slot 31. A locking lever 33 is provided so as to allow means of locking the radial arm at any one of a number of selected positions.

The guide is adapted for ready use with a selection of machine tools including electric routers, saws, jigsaws etc. and the machine tool is fitted to the guide by way of a carriage 10.

Figure 6:
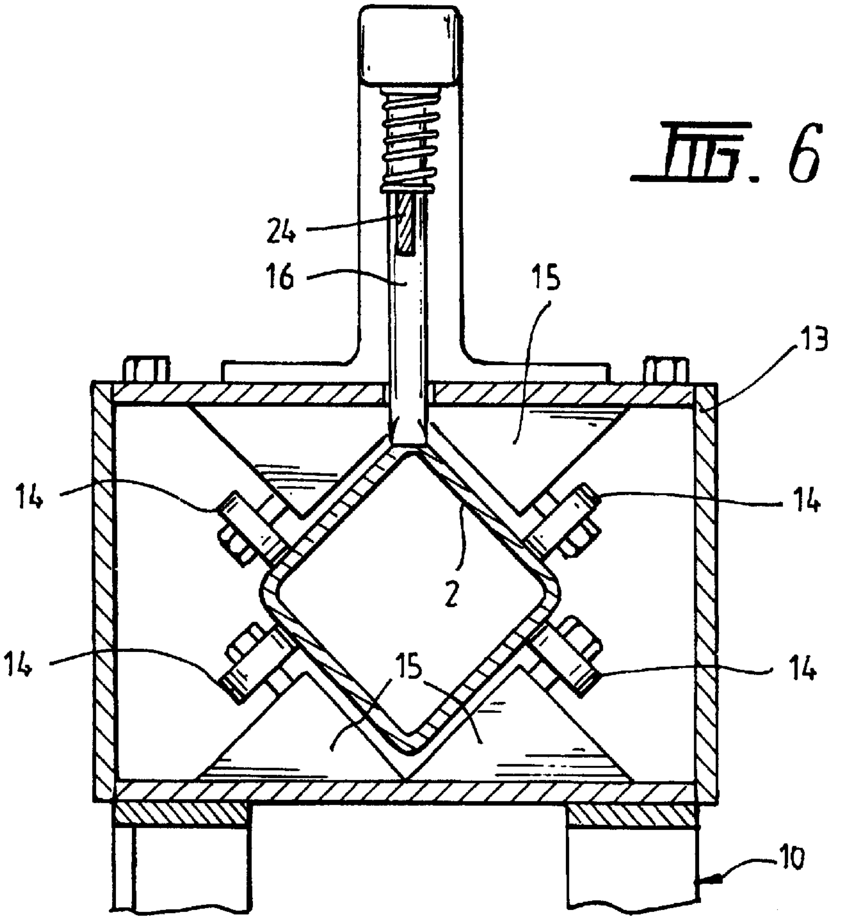
FIG. 6 shows an end view of the carriage transmission housing.

Referring now to FIG. 6, the carriage can be seen to be made up of a transmission housing 13 which slides along the square section horizontal arm 2 with the horizontal arm being mounted on the diagonal. The carriage 10 has a mount fitted to the underneath of the transmission housing where the machine tool can be attached. The transmission housing is provided with a set of roller bearings 14 which are positioned on shaped guides 15 so as to be diagonally orientated to engage the four exposed surfaces of the channel section horizontal arm so as to allow the transmission housing after suitable adjustment, to smoothly traverse the horizontal arm which acts as its own track. The diagonal orientation of the horizontal arm provides the transmission housing with a self levelling and setting facility such that the weight of the transmission housing and fitted machine tool automatically seats the carriage on the horizontal arm. The lower roller wheels 14 are then brought into adjustment to ensure the smooth and continuous snug engagement and faithful tracking of the carriage 10 back and forth along the horizontal arm 2. The carriage is provided with a locking pin 16 attached to a trigger 24 which can be raised or lowered to lock the carriage at any one of a plurality of points along the horizontal arm 2.

In use, the guide of the invention provides a highly improved and versatile overhead radial arm machine tool guide which is particularly adapted for surface dressing of wood but can also function in the capacity of a radial arm saw or a radial arm overhead router. The placement of the upper and lower pivots 13 in vertical spaced apart relationship on the vertical upper column, provide a very secure and rigid pivot system which ensures the horizontal arm suffers virtually no deflection under load and can, with the assistance of the highly adjustable pivot blocks, provide a high level of accuracy which can be maintained through continuous heavy duty use. The particular pivoting mechanisms incorporated in the current invention provide substantial improvement on the prior art radial arm tools which all rely on more compact pivoting mechanisms which introduce measurable vertical motion in the horizontal arm, particularly as the machine tool ages and the component parts wear out. Moreover, the guide of the invention is particularly adapted for radial movement of a machine tool over the surface of a work piece in a series of controlled horizontal arcuate sweeps so as to accurately surface dress large expanses or work with minimal on no requirement to move the work piece relative to the tool.

The invention is not limited to the particular embodiments shown and the claims form part of the disclosure.

What is claimed is:

1. A guide for a machine tool including a vertical upper column adapted for stable positioning at a workstation and an elongate horizontally orientated arm extending outwardly from and pivotally attached to said upper column at a pivot, wherein said upper column is vertically adjustable so as to provide vertical adjustment of said horizontal arm relative to said work station, and wherein said pivot is provided by two vertically spaced apart pivot points so as to allow said arm free arcuate movement in a horizontal plane.

2. A guide according to claim 1 wherein said arm is fitted to said spaced apart pivot points by way of an elongate pivot column bridging said pivot points.

3. A guide according to claim 1 wherein said pivot points are positioned outward of the central axis of said upper column.

4. A guide according to claim 3 wherein the outward position of said pivot is provided by outposts fitted to said column.

5. A method of using the guide of claim 1 to surface dress a workpiece comprising the steps of:

mounting said workpiece under the elongate arm of the guide, and fitting a machine tool to said guide and passing the operating machine tool over the surface of said workpiece.

6. A guide according to claim 1 further including a stand means for mounting said guide on a floor wherein said upper column telescopically co-operates with said stand means to allow said horizontal arm to be adjusted vertically relative to said workstation.

7. A guide according to claim 6 wherein said stand means includes a vertical stand column wherein said upper column is adapted for a snug telescopic fit within said stand column so as to provide smooth co-axial movement between said upper column and said stand means.

8. A guide according to claim 7 wherein said upper column and said stand column are of rectangular channel cross section to prevent radial co-axial movement but allow linear co-axial movement between said upper column and said stand column.

9. A guide according to claim 1 wherein said vertical adjustment or linear co-axial movement is effected by a hydraulic ram fitted to said stand which acts on said upper column.

10. A guide according to claim 1 further including a carriage adapted for fitting to and travel along said elongate arm wherein said carriage is adapted for mounting said machine tool.

11. A guide according to claim 10 wherein said elongate arm has a plurality of stops provided along the length thereof to allow said carriage to be locked at a selected position on said arm.

12. A guide according to claim 1 wherein said elongate arm is provided with a locking means to prevent said arcuate movement.

13. A method according to claim 5 wherein said machine tool is a router and said passage is made as a series of arcuate sweeps of said elongate arm across the surface of said workpiece.

* * * * *